Nov. 1, 1955  A. F. HAYEK  2,722,379
ROTARY MOTION STORAGE DEVICE
Filed May 21, 1954  2 Sheets-Sheet 1
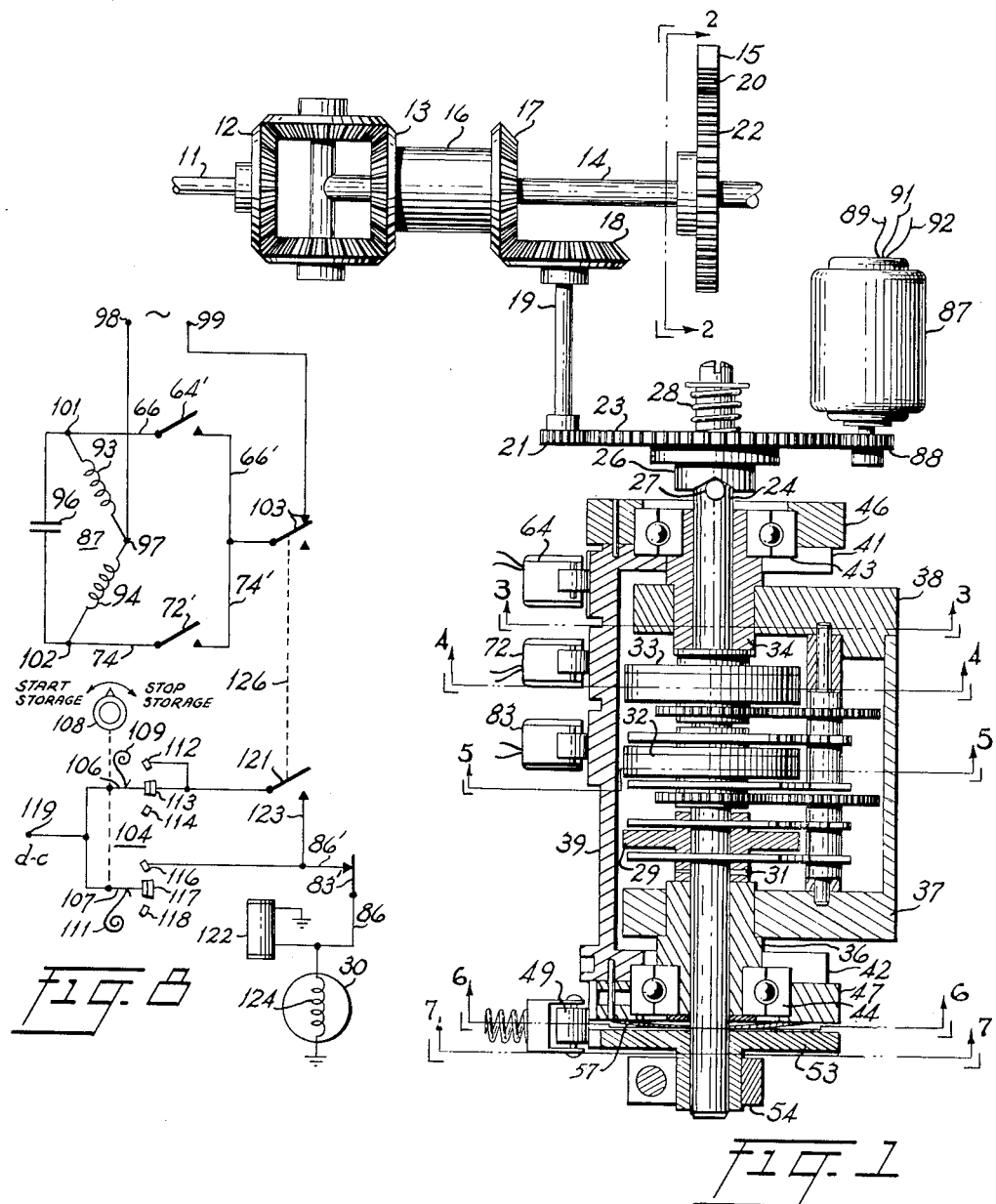
Fig. 1
Fig. 8
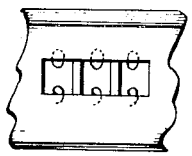
Fig. 9
INVENTOR.
ARTHUR F. HAYEK
BY
*H. A. Mackey*
ATTORNEY.

Nov. 1, 1955     A. F. HAYEK     2,722,379
ROTARY MOTION STORAGE DEVICE
Filed May 21, 1954     2 Sheets-Sheet 2
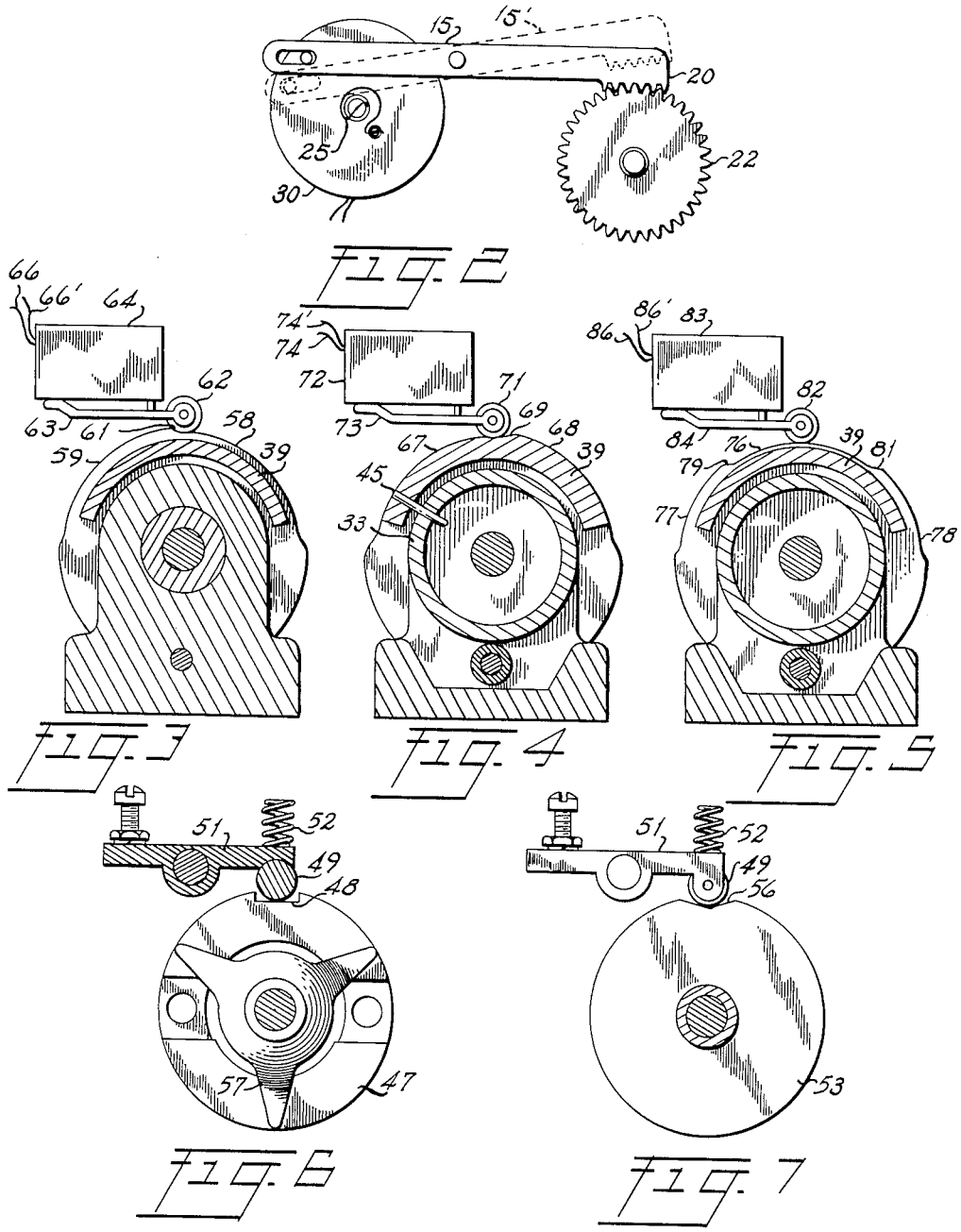
INVENTOR.
ARTHUR F. HAYEK
BY
*H. A. Mackey*
ATTORNEY

United States Patent Office 2,722,379
Patented Nov. 1, 1955

2,722,379

ROTARY MOTION STORAGE DEVICE

Arthur F. Hayek, Pleasantville, N. Y., assignor to General Precision Laboratory Incorporated, a corporation of New York Application May 21, 1954, Serial No. 431,553

5 Claims. (Cl. 235—92)

This invention relates to devices for temporarily storing rotary motion and more explicitly to mechanical devices for receiving and storing specific amounts of angular displacement, which devices feed back the exact amount of stored information when required.

It is frequently desirable to provide a revolution counter or other similar totalizing device which continuously displays the cumulative angular displacement of an input shaft or similar source of input information. At the same time it has also been found desirable to interrupt the operation of the totalizing device to enter corrections or for other purposes without at the same time interrupting the flow of input information applied during this period. In such instances the input information must be stored in a device which accepts such information only during the time the totalizing device ceases its normal operation and this stored information must be fed into the totalizing device when its operation is resumed so that a correct and accurate cumulative total is recorded and displayed.

The present invention provides such a storage device. It is distinguished from preceding devices of the kind in that it has no intrinsic limit to the number of shaft revolutions which it can be designed to store. To this end one of the basic elements of the storage device resembles a multistage revolution counter in which each stage is advanced one unit by each complete revolution of the preceding stage. Since a multistage revolution counter can have one stage or as many stages as are desired to count to any desired maximum, the storage device can store any desired maximum number of shaft revolutions while maintaining high accuracy of delivery of stored angular displacement, so that the total error can be made a very small fraction of one revolution of the input shaft.

One object of this invention is to provide mechanical storage for shaft angular displacement with provision for accurate repossession of the stored displacement.

Another object of this invention is to provide a device for interrupting the flow of shaft angular displacement to a load for a time, for storing the angular displacement during that time, for restoring the flow from shaft to load, and for transmitting to the load the stored displacement.

Another object of this invention is to provide a mechanical angular displacement device having no inherent design limit to the maximum amount of angular displacement storage.

Further understanding of the invention may be secured from the detailed description and drawings, in which:

Figure 1 is a view partly in cross section of the apparatus of the invention.

Figure 2 depicts the electrical lock of the invention.

Figures 3, 4, 5, 6 and 7 are sectional views of Fig. 1 taken on lines 3—3, 4—4, 5—5, 6—6, and 7—7 respectively.

Figure 8 is a schematic diagram of the apparatus of the invention.

Figure 9 is a view of numbered indexing dials used to illustrate proper adjustment of the apparatus.

Referring now to Fig. 1, an input shaft 11 introduces input data in the form of shaft angular displacement. A bevel gear differential comprises bevel gears 12 and 13 and spider shaft 14. Gear 12 is connected to the input data shaft 11 and the spider shaft 14 constitutes the output data shaft connected to operate a load 14', while gear 13 is connected through a sleeve 16 and bevel gears 17 and 18 to a shaft 19 and pinion 21 of the storage device of this invention. A locking device positioned on output shaft 14 is composed of a toothed wheel 22, locking ratchet 20 and ratchet arm 15. These elements together with a rotary solenoid 30 for electrically operating and releasing the locking device are shown more clearly in Fig. 2.

The differential functions to transmit the input data to the output shaft or alternatively to divert the data to the storage device, and during the restoring of stored data to the shaft constitutes a mechanism for adding the restored data to currently received data and for passing the sum to the output shaft. Obviously, in place of the described bevel gear differential any other reversible type of mechanical differential may be employed and the mechanical terminals may be transposed as desired.

The pinion 21 engages and rotates a gear 23 which is mounted on a shaft 24 and which is coupled to the gear 23 through a slip clutch comprising a notched hub 26, a pin 27 fixed in shaft 24, and a spring 28. The shaft 24 constitutes the shaft of a counter of conventional decade type except that it need not include an indicia display, its function being that of a precise reservoir for angular displacement in compact and convenient form. The units wheel 29 is the fastest moving of the decade wheels and is secured by pin 31 to shaft 24. The tens wheel 32 is advanced one-tenth revolution by wheel 29 every time the latter makes one revolution, the coupling between the two wheels by which wheel 32 is intermittently driven being conventional and therefore not described or shown in detail. The hundreds wheel 33 is similarly driven by the tens wheel 32.

The shaft 24 rotates in sleeve bearings 34 and 36 secured to a frame comprising members 37 and 38. Sleeve bearings 34 and 36 also carry a cam 39 in the form of a cutaway cylinder as is indicated by the sectional drawings of Figs. 3, 4 and 5. The cam 39 is secured by means of end flanges 41 and 42, Fig. 1, to ball bearings 43 and 44 which are in turn secured to the external surfaces of sleeve bearings 34 and 36. The end flanges 41 and 42 are pinned to retaining rings 46 and 47 respectively. Cam 39 is pinned by a pin 45, Fig. 4, to the slowest-moving hundreds wheel 33 of the counter.

The retaining ring 47 also serves as a hold-off cam as is indicated in Fig. 6. Ring 47 has a rectangular notch 48 cut in its external circumference which serves as a seat for a spring-loaded roller 49 rotatably secured in the end of a lever 51. A compression spring 52 urges the roller 49 toward the ring 47.

A cam 53 is fastened by a clamp 54, Fig. 1, to the end of the shaft 24. The cam 53 is provided with a V-notch 56, Fig. 7, in its periphery. The roller 49 is long enough to extend across the width of cam 53 as well as across ring 47. A spider spring 57, Fig. 6, is assembled between cam 53 and ring 47 for the purpose of producing friction between them so that when the faster cam 53 is turned, the slower cam 47 tends to be carried around by it. This friction spring tends to eliminate errors and faults due to backlash or lost motion in the counter gear train, as will be described later.

The cylindrical cam 39 carries three partially cylindrical cam surfaces which are respectively indicated in the sectional views of Figs. 3, 4 and 5. The surface of the cam shown in Fig. 3 consists essentially of two cylindrical surfaces of revolution 58 and 59 joined by a riser or rising portion 61. The riser 61 is so positioned that when the cam 39 is in its median position, midway between the two extremes of its permitted range of rotation, a cam follower roller 62 rests on the cylindrical surface 58 having the lesser radius at the beginning of the riser 61. The cam follower roller 62 is secured to the end of the leaf spring lever 63 of an electrical switch 64 of the short throw or micrometer type. The switch 64 is a single-pole single-throw normally-open switch, having open contacts when follower 62 is on surface 58 and closing its contacts when the follower rises to surface 59. The switch is provided with electrical terminal conductors 66 and 66'.

A second cam surface carried by cam 39 is shown in Fig. 4 and is the mirror image of the surface of Fig. 3. The cam surface of Fig. 4 includes a partial cylindrical surface of revolution 67 having a radius equal to that of the surface 58, Fig. 3, and a partial cylindrical surface of revolution 68, Fig. 4, having a larger radius equal to that of surface 59, Fig. 3. The two surfaces 67 and 68, Fig. 4, are joined by a riser 69 commencing its rise at the median plane of the cam. A cam follower roller 71 is provided to actuate an electrical switch 72 through arm 73. The switch is single-pole, single-throw and normally open, and is preferably of the short-throw or micrometer type. When roller 71 rests on surface 67 the switch contacts are open, closing when the roller rises to surface 68. The switch 72 is provided with terminal conductors 74 and 74'.

The third cam surface carried by cam 39 is shown in Fig. 5. This cam surface includes a partial cylindrical surface of revolution 76 having a radius equal to that of surface 58, Fig. 3, and two partial cylindrical surfaces of revolution 77 and 78, Fig. 5, having larger radii equal to that of surface 59, Fig. 3. The surfaces 77 and 78, Fig. 5 are joined to surface 76 by risers 79 and 81. These risers are equidistant on either side of the median plane of cam 39 and permit a movement of the follower on surface 76 for a distance of 36° on either side of the median plane. Cam follower roller 82 actuates an electrical switch 83 through lever 84. The switch 83 is a single-pole, single-throw switch but, unlike switches 64 and 72, is normally closed when the follower 82 rides on the lower surface 76, opening when the follower rises either to surface 77 or to surface 78. The switch is of the short-throw or micrometer type and is provided with terminal conductors 86 and 86'.

A reversible motor 87, Fig. 1, is geared through a pinion 88 to gear 23, and is provided with three terminal conductors 89, 91 and 92. This motor is of the two-phase low-inertia type, but alternatively may be of any other reversible type.

The circuit for the control and operation of the device of the invention is depicted in Fig. 8. Coils 93 and 94 represent the two phase windings of motor 87, Fig. 1, and are bridged by a phase-splitting condenser 96, Fig. 8. The two windings 93 and 94 are connected at their junction 97 to a terminal 98 of a source of alternating electrical power represented by terminals 98 and 99. Coil terminal 101 is connected through conductor 66 to the contact arm 64' of switch 64 shown in Figs. 1 and 3. Coil terminal 102, Fig. 8, is connected through conductor 74 to the contact arm 72' of switch 72 shown in Figs. 1 and 4. Conductors 66' and 74' of switch 64 and 72 are connected together and through normally closed relay contacts 103, Fig. 8, to the power supply terminal 99.

In order to start and stop the storing operation of the device of the invention a manually operated three-position electrical switch 104 is provided having a normal center position and momentary contact positions on either side of the center position. When momentary contact is made at one of these side positions the storing operation is initiated, and when momentary contact is made at the other of these positions the storing operation is terminated and the operation of feeding stored data to the output shaft is commenced. Although a manually operated switch is provided for this purpose, any of several other types of switch may be employed and of course action may be automatic instead of manual, suitable relays being employed for switching.

Switch 104 has two dial contact arms 106 and 107 connected for operation in concert by actuation of a knob 108. Retractile springs 109 and 111 make the end position contacts momentary, restoring the switch to its central position after every operation. Arm 106 is provided with three contacts 112, 113 and 114, and arm 107 is provided with three contacts 116, 117 and 118. In each of the two dials the three contacts are set so close together as to be bridged by the moving contact, which therefore never loses touch with its fixed contacts. Arms 106 and 107 are connected together electrically and to terminal 119 of a source of direct potential. Contacts 112 and 113 are connected to the normally open contact arm 121 of a relay having coil 122. Contact 123 of this relay is connected to switch contact 116. Coil 124 of the rotary solenoid 30, Figs. 2 and 8, is connected in shunt with relay coil 122.

Switch arm 83', Fig. 8, represents the arm of micrometer limit switch 83, Figs. 1 and 5, and is connected in series between the conductors 86 and 86' operating coils 122 and 124, Fig. 8. The dashed line 126 indicates that both contacts 121/123 and 103 constitute part of the relay and are operated in concert by coil 122.

Prior to operation of the storage device let it be supposed that the input shaft 11, Fig. 1, is continuously turning. The locking solenoid 30, Fig. 2, is unenergized so that its retractile spring 25 holds its ratchet 26 clear of toothed wheel 22 in the position indicated by the dashed outline 15', permitting wheel 22 and the output shaft 14 to rotate freely. It may be supposed that the load 14', Fig. 1, constitutes a counter and perhaps an additional load, but that the entire load 14' on output shaft 14 imposes only a small torque load. The differential does not rotate the shaft 19 because the torque load imposed on shaft 19 by the unenergized motor 87, the bearings of shaft 24, the counter mechanism attached to shaft 24, the friction washer 57 and the pressure of spring 52 is considerably greater than the load on shaft 14. As is well known, when a mechanical differential is driven at one mechanical terminal, only that one of the other two terminal shafts rotates which has the lower load.

Let it be supposed that the storage device is in a selected position of angular displacement termed its null reference position. By "null reference position" is meant that position in which the cam 39 is as shown in Figs. 3, 4, and 5, with all three switches 64, 72 and 83 in their normal positions. In order to understand the condition of the counter discs at this null reference position it should be remembered that, in a conventional counter having indicia inscribed on the discs, the counter zero position is that in which zeros appear in the indicia windows, as 000 for a three disc counter. When such a conventional counter is advanced by one unit the units disc moves forward, and no other disc moves, by 1/10 revolution or 36°, and the digit 1 appears in its window, so that the entire reading is 001. But when such a conventional counter is turned backwards from 000 by one-tenth revolution of the units disc, or by —36°, the intermittent mechanism gears the units disc to the tens disc and so turns the tens disc backwards with the units disc, and the intermittent mechanism between the tens and the hundreds disc also drives the hundreds disc backward by 1/10 revolution or 36°. That is, when the units disc is turned backwards so that the display changes from 000 to 999, all three discs turn at the same time, at the same speed, and by the same amount of 36°. If now the units disc should again be turned forward by 36°, the three discs would again be turned forward all together, and the display would again change from 999 to 000. To summarize, during this 36° movement of the units disc all three discs are locked together and turn as a unit.

In the instant mechanism a position at the center of the 36° zone constitutes the null reference position. If indicia were used the display would exhibit half of the 000 number and half of the 999 number at null reference position, as depicted in Fig. 9. In this null reference position, as stated before, the switches 64 and 72 are normal as illustrated in Figs. 3 and 4. When the units disc is moved in either direction from null reference position the hundreds disc and cam 39 pinned to it move with the units disc for 18°, during which movement either switch 64 or switch 72 is operated. The hundreds disc is then released and it and the cam 39 remain stationary during any further progressive movement of the units disc.

Although the indicia 000 and 999 have been employed in describing operation and in Fig. 9, it is obvious that any 36° movement of the hundreds wheel in indexing from any digit position to the next may be employed, with suitable positioning of the pin 45, Fig. 4. The null reference position is at the angular position midway of this 36° angle of motion or midway of the indexing movement of the hundreds wheel.

With conditions as described, when the switch knob 108, Fig. 8, is momentarily turned counterclockwise to "start storage," switch arm 107 is connected to contact 116. Current then flows through relay coil 122, closing contacts 121/123 to lock the relay in its operated position. The relay also opens contacts 103, preventing operation of the motor 87. The rotary solenoid coil 124 is also energized, locking the toothed wheel 22, Fig. 1, and its shaft 14. The input shaft 11 continues to rotate, and its motion is now transmitted through the differential to shaft 19, pinion 21 and gear 23. Gear 23 turns shaft 24, its resistance not being great enough to cause slip clutch 26/27 to slip. Let it be supposed that the rotation is forward and that the counter movement is clockwise as seen in Fig. 3. Simultaneous rotation of all three counter wheels through an angle of 18° now occurs from the null reference position to the position which would correspond to an indication of 000 if indicia were used. During this motion cam 39 is carried clockwise for 18°, operating switch 64 but not operating switch 83. Now further operation corresponding to 99 units, or 9.9 revolutions of wheel 29, can occur without further moving the hundreds wheel 33.

Let it be supposed that at the end of fewer than 99 units, say 51 units, the operation be terminated by momentary movement of knob 108, Fig. 8, clockwise to "stop storage." This opens the relay coil and solenoid circuit at arm 106 and contact 113. The release of solenoid 30 releases ratchet 20, Figs. 1 and 2, freeing toothed wheel 22 and its shaft 14. The relay 122, Fig. 8, is released, opening locking contacts 121/123 and closing motor contacts 103. Since switch 64' is closed, motor 87, Figs. 1 and 8, starts running in such direction as to run the counter mechanism backward from 51 through 000 to its null reference position, when it opens switch 64, stopping itself. Meanwhile the rotation of motor 87 not only restores the counter mechanism but also turns shaft 19, adding, through the differential, to the motion of the output shaft 14 an angular displacement exactly equal to that put into the counter mechanism, having regard for scale factors. The actual number of revolutions added to the output shaft of course depends on the gear ratios of the differential and the location of its spider terminal and these factors may be adjusted so that the actual number of revolutions added to the output shaft by the storage device is exactly equal to the number of revolutions lost during the period the output shaft remained stationary.

The notch 56 in cam 53, Fig. 7, functions to index the shaft 24 accurately at the position of zero displacement by the pressure of roller 49. The notch 48 and disc 47, Fig. 6, while permitting cam 53 to function at the position of zero deflection, at all other positions acts to support the roller 49 so that, as disc 53 turns, the roller does not drop into notch 56 at every revolution.

It is evident that upon returning the storage device to the null reference position, in order for the roller 49 to drop into notch 56 the notch 48 must be in registration with notch 56. However, it is possible for cumulative backlash in the counter train to make cam 47 lag so far behind cam 53 that the notches 48 and 56 are not near enough to registry to permit roller 49 to drop into the notches. This condition is somewhat mitigated by the use of the spring friction washer 57 between cams 47 and 53. When this washer is used, the motion of the faster-moving cam 53 tends to pick up cam 47 and carry it with it to the extent permitted by the lost motion in the counter train. The notch 48 will then generally be in advance of notch 56 but not so far in advance as it would lag without the washer 57.

Another and very important function of the washer 57 is to eliminate hunting due to overshoot of cam 53. Use of the washer causes one of the motor cutoff cams of Figs. 3 and 4 to cut off the motor slightly before the notch 56 reaches its position of zero deflection, and the motor coasts until the notch 56 reaches its zero position, stopping the mechanism under the condition of no applied power so that cam 53 does not overshoot.

If through oversight of the operator or other reason the storage operation is not stopped before the storage device has reached its limit, the limit switch 83 comes into use. This switch stops the storage operation and starts the return of data before the cam 39 has turned far enough to encounter mechanical interference with other parts. However, if the limit switch 83 should fail, thus not stopping the storage operation, and if consequently the cam 39 should strike other parts such as the base of the device, then the slip clutch comprising hub 26, pin 27 and spring 28 would slip, preventing injury to the device. However in operation of the limit switch or during slipping of the clutch the rotations of the input shaft would not be stored and equivalent rotational angle could not be restored to the output shaft.

In operation of the limit switch 83 the limit switch arm 83', Fig. 8, is opened upon the 100 unit of operation of the counter mechanism if going forward, as described, or upon the 899 unit of operation of the mechanism if going backward. In the first case the mechanism attempts to move the cam 39 further clockwise, but at 36° from its null reference position the riser 79, Fig. 5, encounters the follower roller 82, operating limit switch 83. Its arm 83', Fig. 8, opens its contact, releasing the freeze clutch solenoid 30 and permitting the output shaft 14 to rotate. Relay coil 122 also is released, closing contacts 103 and starting motor 87. Both the motor rotation and the input data shaft rotation then simultaneously feed through the differential and out shaft 14 until the storage device has returned to its null reference position, when the motor stops. Thereafter the input data of shaft 11 continue to feed through the differential exclusively to the output shaft 14. In the second case of counterclockwise rotation similar operation occurs.

It will be readily understood of course that if greater capacity of the storage device is desired, a counter mechanism of a greater number of stages may be used and the invention is not limited to a device using any particular number of counter stages.

What is claimed is:

1. A motion storage device comprising, an input shaft, an output shaft operating a low resistance load, a gear differential having a first element thereof connected to said input shaft and a second element thereof connected to said output shaft, a counter mechanism including a plurality of stages interconnected by transfer mechanisms for operation in progressively increasing orders at successively decreasing speeds, said counter mechanism being rotatable in opposite directions from a position of selected angular displacement, the lowest order stage of said counter mechanism being connected to a third element of said differential, an electric motor coupled to said third element, means for locking said load to prevent rotation thereof whereby rotational displacement of said input shaft results in rotation of said counter mechanism through said differential, means for unlocking said load and simultaneously initiating rotation of said motor in a direction such as to rotate said third element in a direction opposite to that produced by the rotational displacement of said input shaft, and means operated by said counter mechanism for stopping rotation of said motor on return of said counter mechanism to its position of selected angular displacement.

2. A motion storage device comprising, an input shaft, an output shaft operating a low resistance load, a gear differential having a first element thereof connected to said input shaft and a second element thereof connected to said output shaft, a counter mechanism rotatable in opposite directions from a position of selected angular displacement, said counter mechanism including a plurality of stages interconnected by transfer mechanisms for operation in progressively increasing orders at successively decreasing speeds and having its lowest order stage coupled to a third element of said differential, a plurality of cam members connected to and actuated by the highest order stage of said counter mechanism, a plurality of switches engaging said respective cam members and actuated thereby, an electric motor connected to the third element of said differential and the lowest order stage of said counter mechanism, brake means for preventing rotation of said load whereby rotational displacement of said input shaft produces a corresponding rotation of said counter mechanism through said differential, and means including said cam engaging switches for simultaneously releasing said brake means and initiating rotation of said motor in a direction to rotate said counter mechanism and the third element of said differential in a direction opposite to that produced by the rotational displacement of said input shaft and for stopping rotation of said motor on return of said counter mechanism to its position of selected angular displacement.

3. A motion storage device in accordance with claim 2 having a circular disc provided with a notch secured to and operated by the lowest order stage, a second circular disc provided with a notch secured to and operated by the highest order stage, friction means interposed between and bearing on said first and second mentioned circular discs, and a spring loaded follower bearing on and common to said circular disc for engaging each of said notches when said counter mechanism is in its position of selected angular displacement.

4. A motion storage device comprising, an input shaft, an output shaft operating a load, a gear differential having a first element thereof connected to said input shaft and a second element thereof connected to said output shaft, a counter mechanism rotatable in opposite directions from a position of selected angular displacement, said counter mechanism including a plurality of stages interconnected by transfer mechanisms for operation in progressively increasing orders at successively decreasing speeds and having its lowest order stage coupled to a third element of said differential, an electric motor connected to the third element of said differential and the lowest order stage of said counter mechanism, brake means for preventing rotation of said load whereby rotational displacement of said input shaft produces a corresponding rotation of said counter mechanism through said differential, a cam member connected to and operated by the highest order stage of said counter mechanism, a pair of complementary cam surfaces on said cam member, a pair of reversing switches engaging said respective cam surfaces, means including said reversing switches for simultaneously releasing said brake means and initiating rotation of said motor in a direction to rotate said counter mechanism and the third element of said differential in a direction opposite to that produced by the rotational displacement of said input shaft and for stopping rotation of said motor on return of said counter mechanism to its position of selected angular displacement, a third cam surface on said cam member, a limit switch engaging said third cam surface, and means including said limit switch for releasing said brake and means starting said motor when said counter mechanism has been displaced a preselected amount from its position of selected angular displacement, said counter mechanism and its associated motor having a greater resistive torque than said load.

5. A motion storage device in accordance with claim 4 having a circular disc provided with a notch secured to and operated by the lowest order stage, a second circular disc provided with a notch secured to and operated by the highest order stage, friction means interposed between and bearing on said first and second mentioned circular discs, and a spring loaded follower bearing on and common to said circular discs for engaging each of said notches when said counter mechanism is in its position of selected angular displacement.

References Cited in the file of this patent

UNITED STATES PATENTS

| | | |
|---|---|---|
| 1,280,754 | Julius | Oct. 8, 1918 |
| 2,538,243 | Hazard et al. | Jan. 16, 1951 |
| 2,579,731 | Fagin | Dec. 25, 1951 |